Dec. 16, 1958 C. W. KONCYK 2,864,508

PHONOGRAPH RECORDS STORAGE RACK

Filed July 12, 1957 2 Sheets-Sheet 1

INVENTOR.
CHESTER W. KONCYK,
BY
McMorrow, Berman + Davidson
ATTORNEYS.

INVENTOR.
CHESTER W. KONCYK,
BY
McMorrow, Berman + Davidson
ATTORNEYS.

2,864,508

PHONOGRAPH RECORDS STORAGE RACK

Chester W. Koncyk, Elyria, Ohio

Application July 12, 1957, Serial No. 671,534

2 Claims. (Cl. 211—40)

The present invention relates to a storage rack for phonograph records.

An object of the present invention is to provide a storage rack for phonograph records which enables a user thereof to readily select a record therefrom for playing and as readily return such record to its place of storage on the rack.

Another object of the present invention is to provide a storage rack of neat and attractive appearance, one which enables a user thereof to quickly identify a record for selection, one which is sturdy in construction and simple in structure, and one which is economically feasible.

These and other objects and advantages of the present invention will be fully apparent from the following description taken in connection with the annexed drawings, in which.

Figures 1, 2:
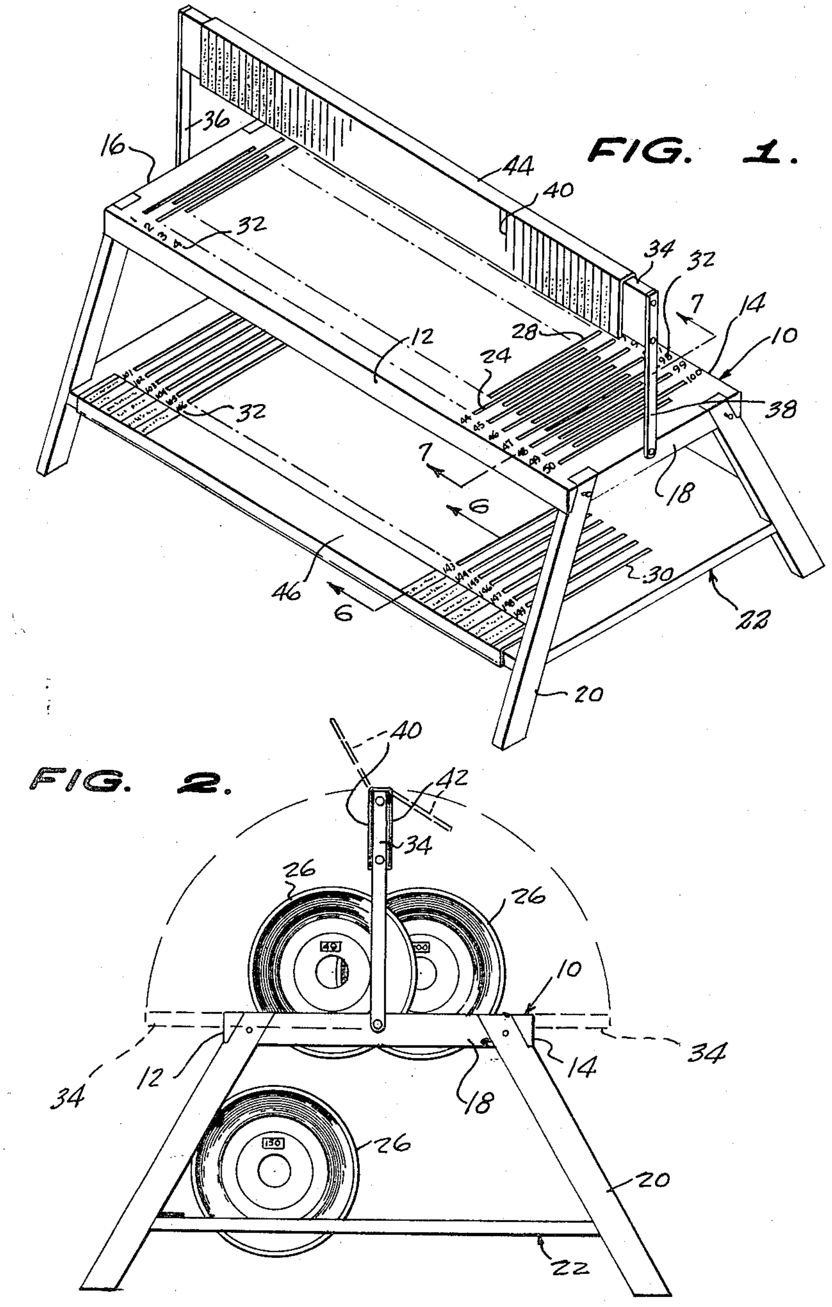
Figure 1 is an isometric view of the phonograph records storage rack according to the present invention.
Figure 2 is an elevational view, on an enlarged scale, of the assembly shown in Figure 1 with records in a position of storage thereon.

Referring in greater detail to the drawings in which like numbers indicate like parts throughout the several views, the phonograph records storage rack according to the present invention comprises a horizontally disposed platform having spaced side edges 12 and 14, an end edge 16 extending between one of the adjacent ends of the side edges 12 and 14 and another end edge 18 extending between the other ends of the side edges 12 and 14. A plurality of legs 20, four in number, support the platform 10 in spaced relation above a floor surface, the latter not being shown. A second platform 22 is spaced parallel to and below the platform 10 and is supported on the legs 20 upwardly of the lower ends of the latter.

The platform 10 is provided with a first plurality of closed slots 24 arranged in parallel spaced relation with respect to each other and with respect to the end edges 16 and 18 of the platform 10. The slots 24 extend along the side edge 12 of the platform 10 from a point spaced inwardly of the one end edge 16 to a point spaced inwardly of the other end edge 18 of the platform 10. Each of the slots 24 has one of its ends adjacent to and spaced from the platform side edge 12. Each of the slots 24 is of a length such as to receive a peripheral portion of a phonograph record 26 and also of a length greater than the diameter of the phonograph record 26. Each slot 24 is of a width to conformably receive the thickness of the record portion.

The platform 10 is also provided with a second plurality of closed slots 28, each arranged between the adjacent ones of the slots 24 with one of the ends of the slots 28 adjacent to and spaced from the side edge 14 of the platform 10.

The platform 22 is also provided with a plurality of closed slots 30 extending inwardly from a point adjacent to and spaced from the side edge of the platform 22 contiguous to the side edge 12 of the platform 10.

The portion of the upper face of platform 10 between the ends of the slots 24 and the side edge 12 is provided with numerical indicia individual numbers of which are in registry with the adjacent ends of the slots 24. Other numerical indicia is arranged along the upper face of the platform 10 between the side edge 14 and the adjacent ends of the slots 28. The platform 22 is similarly provided with numerical indicia between the side edge of the platform 22 corresponding to the side edge 12 of the platform 10 and the adjacent ends of the slots 30. Each row of indicia is designated by the reference numeral 32 in Figure 1.

A horizontally disposed bar 34 having two opposed flat faces disposed vertically is positioned midway between the platform side edges 12 and 14 and is spaced above the platform 10 and extends from the end edge 16 to the end edge 18. The ends of the bar 34 are connected to the ends of the platform 10 by means of arms 36 and 38, each having an end portion fixedly secured to the bar 34 and having its other end pivotally secured to the platform 10 end edges 16 and 18 for swinging movement from the position in which the sides of the bar 34 are vertical to a horizontal position, and is shown in dotted lines in Figure 2, outwardly of and contiguous to either of the side edges 12 and 14.

An index plate 40 having two opposed flat faces covers one of the flat faces of the bar 34 and another index plate 42 covers the other of the faces of the bar 34. The index plates 40 and 42 are connected by means of a flexible strip 44 to the edge of the bar 34 remote from the platform 10, for swinging movement, as shown in dotted lines in Figure 2, from the full line position to the dotted line position outwardly of the bar 34.

Figures 3, 4, 5, 6, 7:
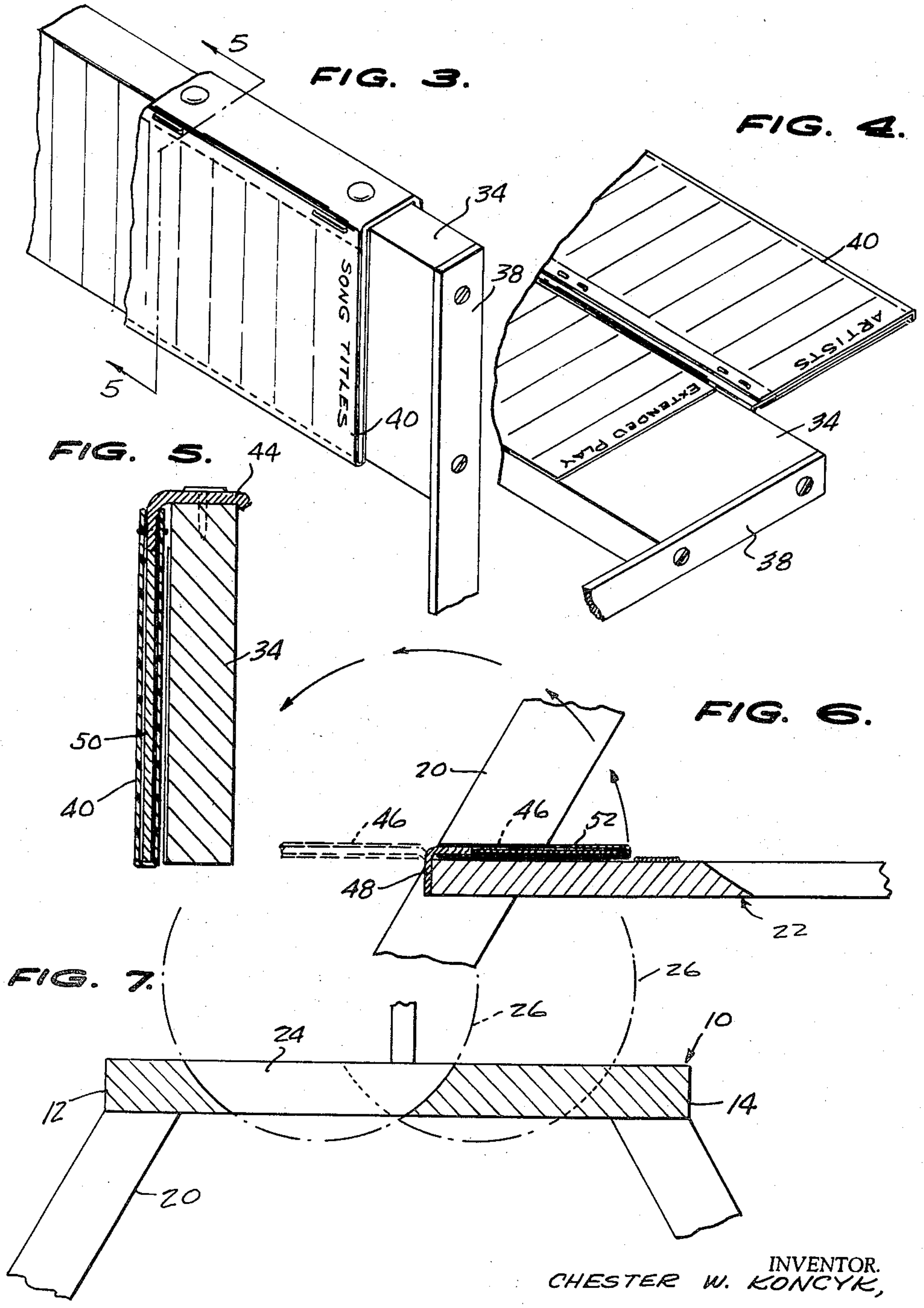
Figure 3 is a fragmentary isometric view of a portion of the record indexing means, showing it in folded condition.
Figure 4 is a fragmentary isometric view of the assembly of Figure 3, showing the indexing means in extended position.
Figure 5 is a sectional view taken on the line 5—5 of Figure 3.
Figure 6 is a sectional view, on an enlarged scale, taken on the line 6—6 of Figure 1.
Figure 7 is a sectional view, on an enlarged scale, taken on the line 7—7 of Figure 1.

A similar index plate 46 normally covers the portion of the platform 22 between the respective index 32 and the one side edge of the platform 22 adjacent the platform side edge 12, the plate 46 being connected by a second flexible strip 48 to the side edge of the platform 22 for swinging movement from the position covering that portion of the platform 22 to a position disposed horizontally and outwardly of the platform side edge. This position outwardly of the platform side edge is shown in dotted lines in Figure 6.

Each of the index plates 40, 42 and 46 are fabricated of transparent material in the form of an open ended sleeve into which may be inserted a paper sheet 50 (Figure 5) bearing thereon record identification data. Preferably, such data is printed on both sides of the sheet 50.

When the bar 34 has been swung to its position outwardly of the side edge 12 or 14 of the platform 10, the indicia upon one face of the respective index plates 40 and 42 will be found to be in registry with the indicia 32 arranged along the portion of the platform 10 adjacent the respective side edge 12 or 14. When the index plate 40 or 42 is swung outwardly from the bar 34 with the bar 34 in its outwardly swung position adjacent one of the side edge 12 or 14, the indicia on the other of the faces of the index plate 40 or 42 will be found to be in registry with the adjacent indicia 32. The index plate 46 is similarly constructed with a sheet 52 thereon having data on both sides and visible through the index plate 46 with the data on the sheet 52 in registry with the indicia 32 on the platform 22 when the plate 46 is either in the full line position covering the portion of the platform 22 or in the outwardly swung position shown in the dotted lines in Figure 6.

In use, the phonograph record storage rack, according to the present invention, may be manufactured in such length as to store as many records as desired. For example, the platform 10 may have the one row or plurality of slots 24 of a number totaling fifty with indicia numbers extending from one to fifty and the second row or second plurality of slots 28 also totaling fifty with the indicia numbers extending from fifty-one to one hundred. The slots 30 in the platform 22 may then be numbered consecutively from one hundred and one to one hundred and fifty with the slots 30 spaced further apart than the slots 24 and slots 28. The sheets 50 and 52 may be printed or otherwise inscribed with record identification data as desired. The name of the musical piece of the record may be on one side of the sheet 50 or 52 with the name of the performer or title of the instrumentalist or band on the other face of the sheet 50 or 52. When the bar 34 is swung to its position outwardly of the side edge of the platform 10, the information contained on the sheet 50 will be readily available to the user for identification of the record to be selected for playing. When in the upright position, as shown in Figure 1, the bar 34 serves as a handle for transporting the storage rack of the present invention. The storage rack of the present invention is seen to be neat and attractive in appearance and may be considered as an article of furniture and offers to the user a convenient method of storing a plurality of records for ready selection and convenient accessibility.

While only a single embodiment of the present invention has been shown and described, other embodiments are contemplated and numerous changes and modifications may be made therein without departing from the spirit of the invention as set forth in the appended claims.

What is claimed is:

1. A phonograph record storage rack comprising a horizontally disposed platform having spaced side edges and an end edge extending between the adjacent ends of said side edges, a plurality of legs adapted to support the platform above a floor surface, there being a plurality of closed slots in said platform arranged in parallel spaced relation with respect to each other and with the end edges of said platform, said slots extending along one of the side edges of the platform from a point spaced inwardly of one end edge of the platform to a point spaced inwardly of the other end edge of the platform with one of the ends of the respective slots being adjacent to and spaced from said platform one side edge, each of said slots being of a length such as to receive a peripheral portion of a phonograph record of less than the diameter thereof and being of a width to conformably receive the thickness of said record peripheral portion, said platform being provided on the portion of the upper face thereof between said one ends of said slots and said platform one side edge with numerical indicia in registry with said one ends of said slots, a vertically disposed bar having one flat face positioned midway between the platform side edges and spaced above said platform and extending from one of said end edges to the other of said end edges of said platform and connected to the end edges of said platform for swinging movement from the vertical position to a position in which it is outwardly of and contiguous to said platform one side edge, said bar having one flat face, an index plate having two opposed flat faces, one of said faces having record identification data arranged therealong and the other of the faces of said index plate having other record identification data arranged therealong, said index plate normally covering said flat face of said bar and connected to said bar for swinging movement outwardly of said bar, said index plate when the bar has been swung to its position outwardly of said platform one side edge having the first named data in registry with said platform indicia and when said index plate is swung outwardly of the bar in its outwardly swung position having its other data in registry with said platform indicia.

2. A phonograph record storage rack comprising a horizontally disposed platform having spaced side edges and an end edge extending between the adjacent ends of said side edges, a plurality of legs adapted to support the platform above a surface, there being a first plurality of closed slots in said platform arranged in parallel spaced relation with respect to each other and with the end edges of said platform, said slots extending along one of the side edges of the platform from a point spaced inwardly of one end edge of the platform to a point spaced inwardly of the other end edge of the platform with one of the ends of the respective slots being adjacent to and spaced from said platform one side edge, said platform being provided with a second plurality of closed slots each arranged between adjacent slots of said first plurality of slots with one of the ends of the slots of said second plurality of slots being adjacent to and spaced from the other side edge of said platform, each of said slots being of a length such as to receive a peripheral portion of a phonograph record of less than the diameter thereof and being of a width to conformably receive the thickness of said record peripheral portion, said platform being provided on the portion of the upper face thereof between said one ends of said slots and the adjacent side edge of said platform with numerical indicia in registry with said one ends of said slots, a vertically disposed bar positioned midway between the platform side edges and spaced above said platform and extending from one of said end edges to the other of said end edges of said platform and connected to the end edges of said platform for swinging movement from the vertical position to positions in which it is outwardly of and contiguous to either of said platform one or other side edges, said bar having opposed flat faces, and an index plate having two opposed flat faces, normally covering each of the flat faces of said bar, one face of each of said index plates having record identification data arranged therealong and the other face of each of said index plates having other record identification data arranged therealong, one of said index plates when the bar has been swung to its position outwardly of said platform one side edge having the first named data in registry with said platform one side edge indicia and when said one index plate is swung outwardly of the bar in its outwardly swung position having its other data in registry with said platform one side indicia, the other of said index plates when the bar has been swung to its position outwardly of said platform other side edge having the first named data of said other index plate in registry with said platform other side edge indicia and when said other index plate is swung outwardly of the bar in its outwardly swung position having its other data in registry with said platform other side edge indicia.

References Cited in the file of this patent

UNITED STATES PATENTS

| | | |
|---|---|---|
| 1,755,074 | Ray | Apr. 15, 1930 |
| 2,436,271 | Simmons | Feb. 17, 1948 |
| 2,593,927 | Slattery | Apr. 22, 1952 |